United States Patent
Luszcz

(10) Patent No.: US 10,647,413 B2
(45) Date of Patent: May 12, 2020

(54) ENHANCED ENGINE LOAD DEMAND ANTICIPATION

(71) Applicant: Sikorsky Aircraft Corporation, Stratford, CT (US)

(72) Inventor: Matthew T. Luszcz, Hamden, CT (US)

(73) Assignee: SIKORSKY AIRCRAFT CORPORATION, Stratford, CT (US)

( * ) Notice: Subject to any disclaimer, the term of this patent is extended or adjusted under 35 U.S.C. 154(b) by 91 days.

(21) Appl. No.: 15/326,309

(22) PCT Filed: Sep. 29, 2015

(86) PCT No.: PCT/US2015/052899
§ 371 (c)(1),
(2) Date: Jan. 13, 2017

(87) PCT Pub. No.: WO2016/054014
PCT Pub. Date: Apr. 7, 2016

(65) Prior Publication Data
US 2017/0203832 A1 Jul. 20, 2017

Related U.S. Application Data

(60) Provisional application No. 62/057,611, filed on Sep. 30, 2014.

(51) Int. Cl.
*B64C 13/50* (2006.01)
*B64D 43/02* (2006.01)
*G01C 23/00* (2006.01)

(52) U.S. Cl.
CPC ............ *B64C 13/503* (2013.01); *B64D 43/02* (2013.01); *G01C 23/00* (2013.01)

(58) Field of Classification Search
CPC ........ B64C 13/503; B64D 43/02; G01C 23/00
See application file for complete search history.

(56) References Cited

U.S. PATENT DOCUMENTS

| 3,814,912 A * | 6/1974 | Manke .................. G05D 1/063 |
| | | 701/6 |
| 4,947,334 A * | 8/1990 | Massey ................. B64C 13/503 |
| | | 701/3 |
| 4,965,879 A | 10/1990 | Fischer |

(Continued)

OTHER PUBLICATIONS

Wayne Johnson, "Helicopter Theory", Mar. 7, 2012, Courier Corporation, 2012 Edition, 1120 pages https://books.google.com/books?id=SgZheyNeXJIC&lpg=PP1&pg=PA290#v=onepage&q&f=false a copy of this NPL is not being provided due to its length, but is fully accessible using the above link (Year: 2012).*

(Continued)

*Primary Examiner* — Thomas E Worden
(74) *Attorney, Agent, or Firm* — Cantor Colburn LLP

(57) ABSTRACT

A flight control system of an aircraft is provided and includes modules configured to shape one or more flight control commands through a flight control system to provide a shaped flight control command and to determine expected power required data for the shaped flight control command. The flight control system further includes an architecture configured to determine enhanced engine load demand anticipation utilizing data reflective of an angle of attack of the aircraft for use in a determination of the expected power required data.

9 Claims, 4 Drawing Sheets

(56) References Cited

U.S. PATENT DOCUMENTS

| | | | | |
|---|---|---|---|---|
| 4,980,835 | A * | 12/1990 | Lawrence | B64C 27/325 244/17.11 |
| 5,174,716 | A * | 12/1992 | Hora | B64C 11/32 416/129 |
| 5,330,131 | A * | 7/1994 | Burcham | B64C 15/02 244/182 |
| 5,428,543 | A * | 6/1995 | Gold | G05D 1/0669 244/17.13 |
| 6,041,273 | A * | 3/2000 | Burken | B64D 31/06 244/12.4 |
| 7,931,231 | B2 | 4/2011 | Cherepinsky et al. | |
| 8,209,069 | B1 * | 6/2012 | McLoughlin | G01C 21/165 244/158.1 |
| 9,891,632 | B1 * | 2/2018 | Irwin | B64D 43/00 |
| 2007/0164167 | A1 * | 7/2007 | Bachelder | G05D 1/105 244/220 |
| 2008/0111399 | A1 * | 5/2008 | Zierten | B64C 27/605 296/210 |
| 2010/0100260 | A1 * | 4/2010 | McIntyre | B64C 13/503 701/6 |
| 2010/0318336 | A1 * | 12/2010 | Falangas | G05B 17/02 703/8 |
| 2013/0153706 | A1 * | 6/2013 | Lindmark | B63B 1/041 244/2 |
| 2014/0288731 | A1 | 9/2014 | Hagerott et al. | |
| 2015/0247953 | A1 * | 9/2015 | O'Brien | F03D 17/00 702/3 |
| 2017/0210466 | A1 * | 7/2017 | Cherepinsky | G05D 1/0669 |

OTHER PUBLICATIONS

C. Young, "The Prediction of Helicopter Rotor Hover Performance Using a Prescribed Wake Analysis", Aerodynamics Dept., R.A.E., Farnborough, London: Her Majesty's Stationery Office, 1976, 56 pages.

PCT Application No. PCT/US15/52899, ISR/WO, dated Jan. 4, 2016, 16 pages.

James William Loiselle, "Generalized Helicopter Rotor Performance Predicitons", Naval Postgraduate School, Monterey, California, Sep. 1977, 139 pages.

Kyle Yi-Ling Yang, "Helicopter Rotor Lift Distributions for Minimum Induced Power Loss", Massachusetts Institute of Technology, Sep. 1993, 127 pages.

Siva et al., "Uncertainty Quantification in Helicopter Performance Using Monte Carlo Simulations", Journal of Aircraft, vol. 48, No. 5, Sep.-Oct. 2011, 9 pages.

Tangier et al., "Wind Turbine Post-Stall Airfoil Performance Characteristics Guidelines for Blade-Element Momentum Methods", American Institute of Aeronautics and Astronautics, downloaded from http://wind.nrel.gov/designcodes/papers/Tangler_05AIAApaperf_0591a.pdf on Nov. 22, 2013, 10 pages.

* cited by examiner

ENHANCED ENGINE LOAD DEMAND ANTICIPATION

This application is a National Phase Application of Patent Application PCT/US15/52899 filed on Sep. 29, 2015, which claims the benefit of and priority to U.S. Provisional Patent Application Ser. No. 62/057,611 filed on Sep. 30, 2014, the contents of which are incorporated herein by reference in their entirety.

BACKGROUND OF THE INVENTION

The subject matter disclosed herein relates to enhanced engine load demand anticipation and, more particularly, to using angle of attack data in enhanced engine load demand anticipation in a helicopter.

In a rotary-wing aircraft application, engine anticipation may be part of the engine control system to maintain rotor speed within a relatively narrow range in response to demanded torque from the rotary-wing aircraft rotor system. The capability of the engine control algorithm to correctly anticipate changes in power required directly impact rotor speed governor performance.

Conventional engine power anticipation algorithms include collective pitch based anticipators, predictive anticipators and lookup-table based anticipation algorithms that add atmospheric variation, reference rotor speed and airspeed data to collective anticipation concepts. In some cases, tail rotor power requirement data is also added.

Collective pitch based anticipators are most commonly utilized on current generation rotary-wing aircraft. The engine power anticipation algorithm utilizes changes in collective control displacement as collective pitch change has a significant effect on power required. The collective control position is monitored and fuel flow is adjusted based on collective control displacement. This type of an algorithm is typically implemented via mechanical or electronic feedback. Collective pitch based anticipator performance may be imperfect, however, since power required depends on a multitude of factors, such as air speed, gross weight, maneuver, etc.

Predictive anticipators are currently under development. This category of engine power anticipation algorithms monitor various states of the aircraft and attempt to predict changes in power required with a neural-network which must be trained on each particular engine and aircraft. There are known certification issues with predictive anticipators, however, since the neural network is not deterministic.

BRIEF DESCRIPTION OF THE INVENTION

According to one aspect of the invention, a flight control system of an aircraft is provided and includes modules configured to shape one or more flight control commands through a flight control system to provide a shaped flight control command and to determine expected power required data for the shaped flight control command. The flight control system further includes an architecture configured to determine enhanced engine load demand anticipation utilizing data reflective of an angle of attack of the aircraft for use in a determination of the expected power required data.

According to another aspect of the invention, a flight control system of an aircraft is provided and includes modules configured to shape one or more flight control commands through a flight control system to provide a shaped flight control command and to determine expected power required data for the shaped flight control command. The flight control system further includes an architecture configured to determine enhanced engine load demand anticipation utilizing data reflective of a collective setting and angle of attack of the aircraft for use in a determination of the expected power required data.

These and other advantages and features will become more apparent from the following description taken in conjunction with the drawings.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

The description provided below relates to enhanced anticipation of aircraft power demand changes for a rotary wing aircraft, utilizing angle of attack data for more accurate estimation of power required by the main rotor system in steady and maneuvering flight.

Figure 1:
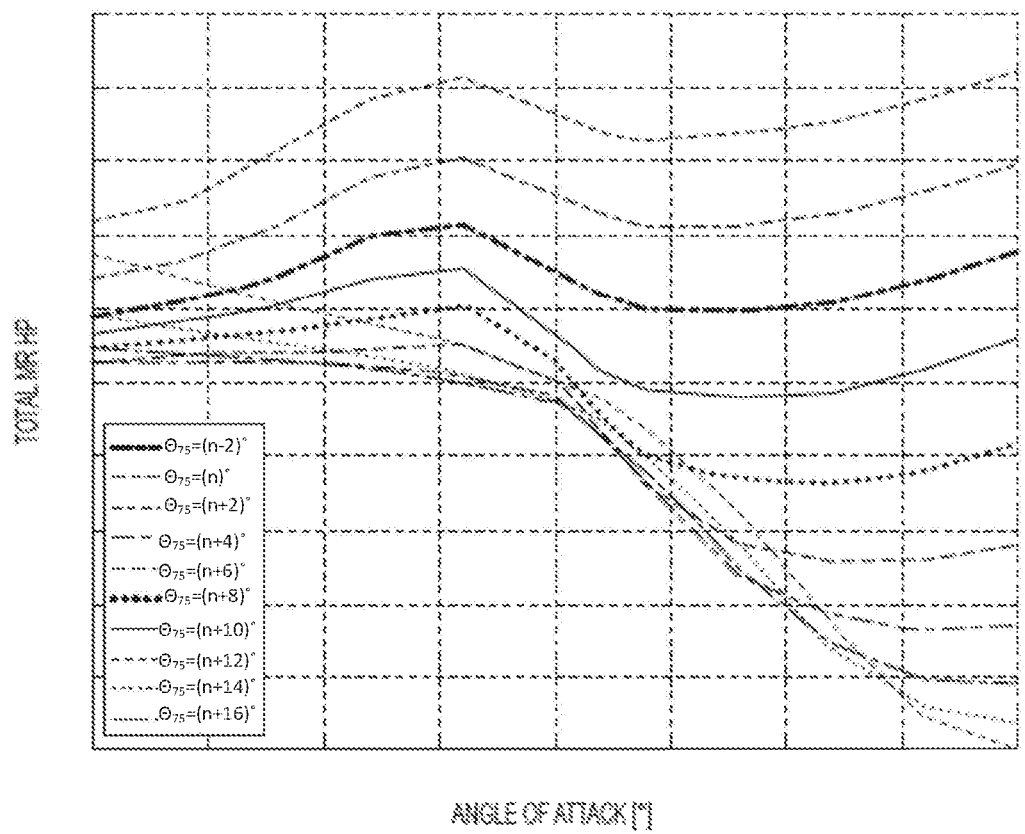
FIG. 1 is a graphical display of rotor power required as a function of collective setting and angle of attack of an aircraft.

Power required by a helicopter main rotor varies tremendously with both collective pitch setting and angle of attack. Existing helicopter engine anticipation algorithms predict power required as a function of collective position but assume level flight conditions. In a hybrid helicopter with multiple control surfaces allowing additional flexibility in setting the trim angle of attack of the main rotor in level flight, or a conventional or hybrid helicopter in climbing/descending flight, collective position alone is insufficient to reasonably predict main rotor power demand. FIG. 1 highlights the sensitivity of rotor system power required versus angle of attack, especially at lower collective settings likely seen in descending flight in any helicopter or even level flight in a hybrid/compound helicopter. Rapid changes in rotor angle of attack during transient maneuvers will also yield significant changes in power required. As a result, an additional burden is placed on the engine power turbine speed governor to maintain rotor speed during maneuvering flight, and larger drive train speed fluctuations are likely.

Torque and power coefficients provide non-dimensional expressions of a power required by an aircraft and are expressed in terms of rotor speed, rotor radius, density and torque as shown in the following equation.

$$C_q = Q/(\Pi \rho \Omega^2 R^5) = C_p$$

The power coefficient of the main rotor in a typical rotary wing design of an aircraft is a function of advance ratio, collective setting, and angle of attack. As long as the collective setting is reasonably high, the angle of attack sensitivity is reduced as shown in FIG. 1. However, some flight conditions and hybrid helicopter designs operate at low collective settings in forward flight, making angle of attack a significant driver for power demand. To simplify the way power required data tables are embedded in the flight control algorithms and reduce required calculations, the density and rotor speed terms can be extracted as a power compensation term as shown in the following equation.

$$P_{wr}C_{omp} = (Nr_{REFERENCE}/Nr_{NOMINAL})^{3} * \rho/\rho_0$$

Figure 2:
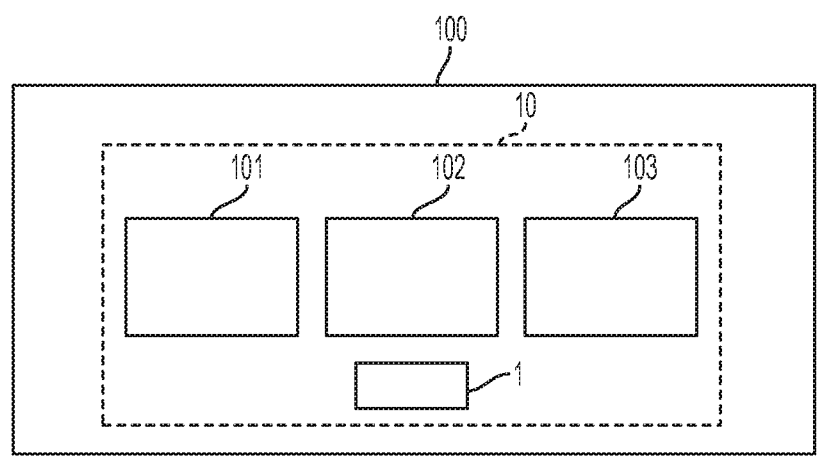
FIG. 2 is a high level schematic diagram of a helicopter control system algorithm.
Figure 3:
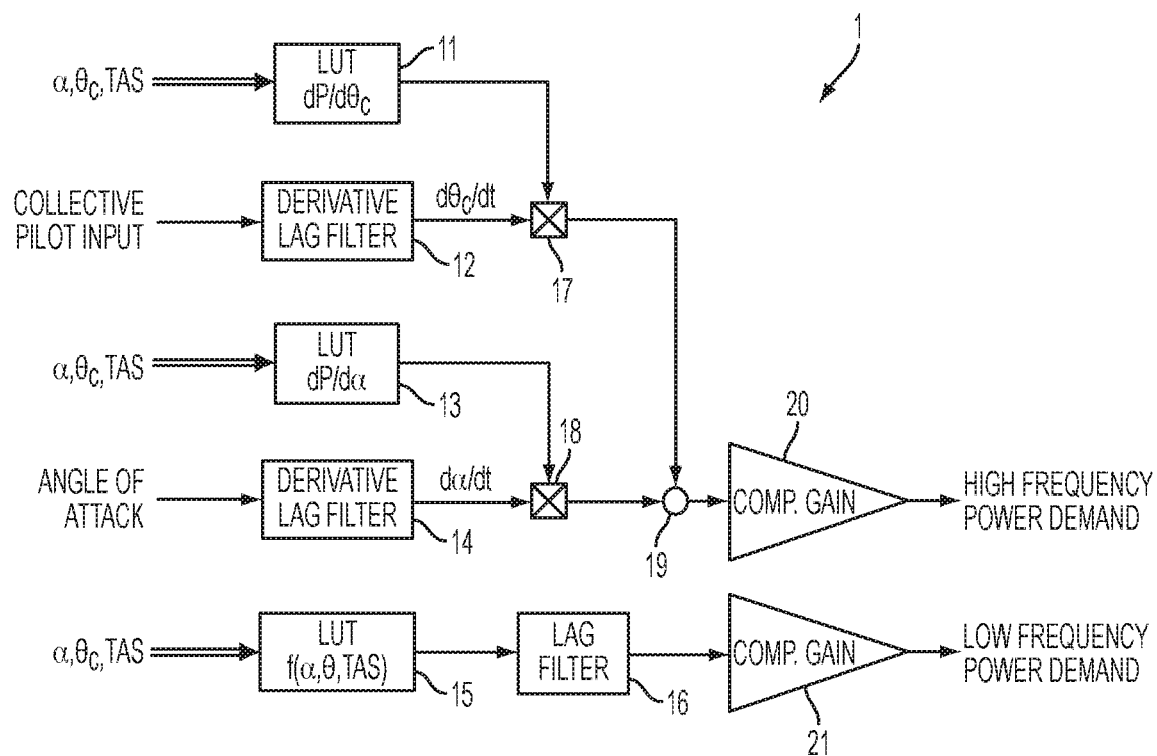
FIG. 3 is a schematic diagram of an architecture of an engine anticipation algorithm.

With reference to FIGS. 2 and 3, a lookup table ("LUT") is created that represents power required for a particular aircraft at nominal rotor speed and standard day flight conditions with airspeed, collective setting and angle of attack as independent inputs. An output of this table is multiplied by the power compensation gain to calculate the power required at off-nominal flight conditions. Additional lookup tables are created that represent the partial derivatives of power required with respect to collective setting and to angle of attack. The outputs of these tables are then multiplied by collective setting rate of change and angle of attack rate of change, respectively, to yield the expected high frequency power demand rate due to each input change. With additional shaping applied to the high frequency power demand rate and the lower frequency "steady" power demand terms, a comprehensive total anticipated power demand output is formed and sent to the engine's power turbine speed governor.

In detail, as shown in FIG. 2, the system 10 may be added to the flight control system of an aircraft 100 that includes a first module 101 that is configured to shape one or more flight control commands through model-following control logic of a fly-by-wire flight control system to provide a shaped flight control command and a second module 102 that is configured to determine expected power required data for the shaped flight control command where the expected power required data is utilized to perform at least one action to maintain for example a reference rotor speed. The system may further include an engine module 103 that performs the at least one action. The flight control system, and modules 101, 102 and 103, may be realized using a computer-implemented system, including processor(s), memory, program code, etc.

The at least one action is performed in the engine controller. Fuel flow to the engine module is regulated through an electronic engine control unit utilizing the engine controller's rotor speed governor algorithm and anticipation data from the flight control system. The at least one action may be operative to modify at least a pitch axis of the aircraft, a roll axis of the aircraft, a yaw axis of the aircraft and/or a lift axis of the aircraft. The at least one action may be initiated prior to an application of the flight control command to an aircraft flight control unit or prior to generation of a resultant aircraft response.

As shown in FIG. 3, the system 10 includes enhanced engine load demand anticipation architecture 1. The architecture 1 is configured to determine enhanced engine load demand anticipation and utilizes data that is reflective of a collective setting and angle of attack of the aircraft for use in, for example, a determination of the expected power required by the second module 102. The architecture 1 includes a first LUT 11, a first derivative lag filter 12, a second LUT 13, a second derivative lag filter 14, a third LUT 15 and a lag filter 16. The architecture 1 further includes a first, second and third summation units 17, 18 and 19 as well as first and second gain compensation units 20 and 21.

The first LUT 11 receives as an input data reflective of an angle of attack α of the aircraft, collective setting position $\theta_c$ of the main rotor blades and an air speed TAS of the aircraft and provides for a determination from that data a relationship between required power P and the collective setting position $\theta_c$ ($dP/d\theta_c$). Thus, the first LUT 11 permits the capturing of high frequency power changes due to changes in the collective setting position $\theta_c$. The first derivative lag filter 12 receives as an input data reflective of a collective setting pilot input and provides for a determination from that data a relationship between the collective setting position $\theta_c$ and time ($d\theta_c/dt$). The second LUT 13 receives as an input data reflective of the angle of attack α of the aircraft, collective setting position $\theta_c$ of the main rotor blades and the air speed TAS of the aircraft and provides for a determination from that data a relationship between required power P and the angle of attack α of the aircraft ($dP/d\alpha$). Thus, the second LUT 13 permits the capturing high frequency power changes due to changes in the angle of attack α. The second derivative lag filter 14 receives as an input data reflective of the angle of attack α and provides for a determination from that data a relationship between the angle of attack α and time ($d\alpha/dt$). The third LUT 15 receives as an input data reflective of the angle of attack α of the aircraft, collective setting position $\theta_c$ of the main rotor blades and the air speed TAS of the aircraft and provides for a determination from that data a steady state required power P as a function of the angle of attack α, the collective setting position $\theta_c$ of the main rotor blades and the air speed TAS of the aircraft f(α, θ, TAS). An output of the third LUT 15 is provided to the lag filter 16.

The respective outputs of the first LUT 11 and the first derivative lag filter 12 are summed at the first summation unit 17 and provide for a reading of power required per second (HP/sec) due to rapid changes in collective setting pilot input. The respective outputs of the second LUT 13 and the second derivative lag filter 14 are summed at the second summation unit 18 and provide for a reading of power required per second (HP/sec) due to rapid changes in the angle of attack α. These summed results are then combined at the third summation unit 19 and output to the first gain compensation unit 20. An output of the first gain compensation unit 20 is thus reflective of a high frequency power demand of the aircraft that takes into account the collective setting pilot input data and the angle of attack α data. The output of the lag filter 16 is in turn output to the second gain compensation unit 21 and then output from the gain compensation unit 21 as a low frequency power demand.

In accordance with further embodiments, possible alternate methods of implementation may be feasible. In some case, an estimate of angle of attack that is derived from other aircraft state data may be made rather than utilizing a direct sensor measurement of angle of attack. For example, a relationship between the angle of attack and time may be modeled based on a commanded pitch rate and air speed. Another possible alternate method of implementation would be to model the power required as an empirical or physics-based model that doesn't utilize lookup tables.

Figure 4:
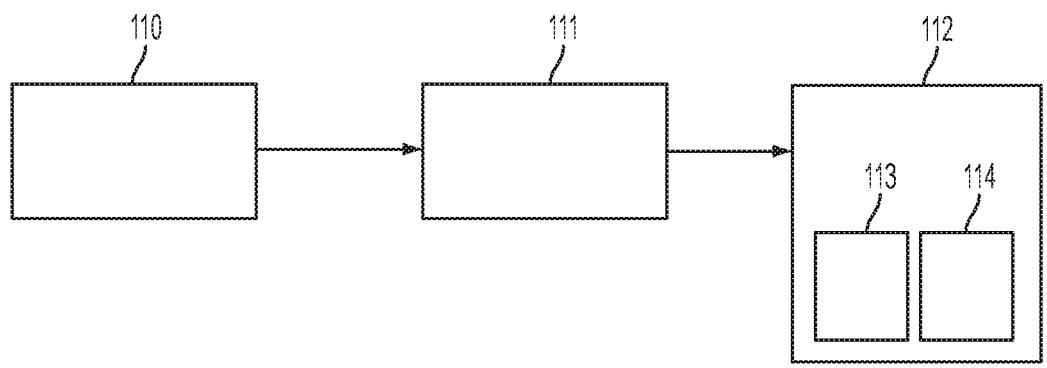
FIG. 4 is a flow diagram illustrating methods of executing an engine anticipation algorithm.

With reference to FIG. 4, a method of executing an engine anticipation algorithm using the architecture 1 described above is provided. The method includes shaping one or more flight control commands through model-following control logic of a fly-by-wire flight control system to provide a shaped flight control command (operation 110) and determining expected power required data for the shaped flight command (operation 111). The method further includes generating enhanced engine load demand anticipation data for the expected power required data by utilizing angle of attack and collective setting data of the aircraft (operation 112). In accordance with alternative embodiments, the utilizing of operation 112 may include directly sensing the angle of attack of the aircraft (operation 113) or estimating the angle of attack from other aircraft state data (operation 114) by, for example, deriving a relationship between the angle of attack and time based on the commanded pitch rate and air speed.

Use of angle of attack data and collective setting data in determining an engine load demand is expected to yield improved anticipation of load demand transients due to changes in flight condition. This, in turn, is expected to yield tighter rotor governing. The improved anticipation will also reduce the severity of maneuvers and flight conditions previously considered "uncompensated for," thus simplifying engine control design.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A flight control system of an aircraft, comprising: a processor configured to:
   receive an angle of attack, collective setting, and airspeed of the aircraft at a selected time;
   determine a first relation between an expected change in power requirement and a change in the collective setting of the aircraft for the received angle of attack, collective setting, and airspeed;
   determine a second relation between the change in the collective setting and a change in time from when the collective setting was received;
   determine a power requirement over time for the aircraft based on the first relation between the expected change in power requirement and the change in the collective setting and the second relation between the change in the collective setting and the change in time; and
   maintain a reference rotor speed by adjusting an engine's power turbine speed governor, wherein the reference rotor speed is a function of the determined power requirement.

2. The flight control system according to claim 1, wherein the processor is further configured to access:
   a first look up table configured to provide the first relation based on the received angle of attack, collective setting, and airspeed;
   a first derivative lag filter configured to determine the second relation from the collective setting; and
   a first gain compensation unit configured to output high frequency power demand data based on a product of the first relation and the second relation.

3. The flight control system according to claim 2, wherein the processor is further configured to access:
   a second look up table configured to determine a third relation between the expected change in power requirement and a change in the angle of attack of the aircraft for the received angle of attack, collective setting, and airspeed; and
   a second derivative lag filter configured to determine a fourth relation between the change in the angle of attack and the change in time from the angle of attack;
   wherein the first gain compensation unit is configured to output the high frequency power demand data based on a sum of the product of the first relation and the second relation and a product of the third relation and the fourth relation.

4. The flight control system according to claim 3, wherein the processor is further configured to access:
   a third look up table configured to determine a steady state required power as a function of the angle of attack, the collective setting, and the airspeed; and
   a second gain compensation unit configured to output low frequency power demand data from output of the third look up table.

5. The flight control system according to claim 1, wherein the angle of attack is at least one or more of sensed, estimated, and modeled.

6. A computer-implemented method of executing an engine anticipation algorithm for an aircraft comprising:
   receiving an angle of attack, collective setting, and airspeed of the aircraft at a selected time;
   determining a first relation between an expected change in power requirement and a change in the collective setting of the aircraft at the received angle of attack, collective setting, and airspeed;
   determining a second relation between the change in the collective setting and the change in time from when the collective setting was received;
   determining a power requirement over time for the aircraft based on the first relation of the expected power requirement and the change in the collective setting and the second relation between the change in the collective setting and the change in time; and
   maintaining a reference rotor speed by adjusting an engine's power turbine speed governor, wherein the reference rotor speed is a function of the determined power requirement.

7. The computer-implemented method according to claim 6, further comprising directly sensing the angle of attack.

8. The computer-implemented method according to claim 6, wherein the utilizing comprises estimating the angle of attack.

9. The computer-implemented method according to claim 6, further comprising estimating a rate of angle of attack based on a commanded pitch rate and airspeed.

* * * * *